United States Patent [19]

Iseki

[11] Patent Number: 5,171,502
[45] Date of Patent: Dec. 15, 1992

[54] METHOD AND APPARATUS FOR FABRICATING A RUBBERIZED WIRE SHEET

[75] Inventor: Tsutomu Iseki, Fukushima, Japan

[73] Assignee: Sumitomo Rubber Industries Ltd., Hyogo, Japan

[21] Appl. No.: 757,991

[22] Filed: Sep. 12, 1991

[30] Foreign Application Priority Data

Sep. 25, 1990 [JP] Japan .................. 2-256015

[51] Int. Cl.⁵ ............................................. B29C 47/02
[52] U.S. Cl. .................. 264/171; 156/244.12; 264/174; 264/175; 425/114; 425/516; 425/115
[58] Field of Search ............. 264/174, 171, 175; 425/114, 115, 113, 516; 156/244.12, 244.11, 244.27

[56] References Cited

U.S. PATENT DOCUMENTS

| | | | |
|---|---|---|---|
| 2,902,083 | 9/1959 | White | 425/114 |
| 3,443,003 | 5/1969 | Anderson | 425/115 |
| 3,847,707 | 11/1974 | Meyer et al. | |
| 3,849,174 | 11/1974 | Ancker | |
| 3,874,833 | 4/1975 | Ancker | |
| 3,898,113 | 8/1975 | Meyer et al. | |
| 3,969,458 | 7/1976 | Hunter | 264/175 |
| 4,464,218 | 8/1984 | Arnold et al. | 156/244.12 |

FOREIGN PATENT DOCUMENTS

| | | | |
|---|---|---|---|
| 0326460 | 8/1989 | European Pat. Off. | |
| 2173257 | 10/1973 | France | |
| 2198822 | 4/1974 | France | |
| 54-36374 | 3/1979 | Japan | 425/114 |
| 56-104042 | 8/1981 | Japan | 264/175 |
| 890247 | 5/1989 | PCT Int'l Appl. | |
| 345805 | 5/1960 | Switzerland | |
| 919078 | 2/1963 | United Kingdom | 425/114 |
| 960488 | 6/1964 | United Kingdom | |

*Primary Examiner*—Jeffery Thurlow

[57] ABSTRACT

A method for fabricating a rubberized wire sheet passes a plurality of wires through an extruder to coat each of the plurality of wires with rubber to form rubberized wires, and passes the plurality of rubberized wires through a calender roller system to form them into the rubberized wire sheet having a desired width. The rubberized wires may be further coated with rubber when calendered in the calender roller system. This method demonstrates an improvement in rubber impregnatability, topping accuracy, processability, and quality.

6 Claims, 5 Drawing Sheets

METHOD AND APPARATUS FOR FABRICATING A RUBBERIZED WIRE SHEET

BACKGROUND OF THE INVENTION AND RELATED ART STATEMENT

This invention relates to a method and an apparatus for fabricating a rubberized wire sheet for use as steel breaker or steel ply for a vehicle tire.

As a method for fabricating a rubberized wire sheet for a tire breaker or tire ply, there has been conventionally adopted the topping calender method to be described hereinbelow. As shown in FIG. 8, two roller pairs 110 and 120 are arranged in a vertical direction. The roller pair 110 consists of two rollers 11. The roller pair 120 consists of two rollers 12. Two masses 10 of preheated rubber are supplied to the two roller pairs 110 and 120 respectively. Also, a predetermined number of wires 1 are fed between the roller pair 110 and the roller pair 120 after being arrayed by an array roller 14. Then, upper and lower surfaces of the predetermined number of wires 1 are pressingly coated with layers 15 of preheated rubber supplied along the surfaces of the rollers 11 and 12, thereby fabricating a rubberized wire sheet 16 having a desired width.

However, there are mainly the following problems in the topping calender method.

1. According to the topping calender method, the rubberized wire sheet 16 is fabricated by vertically sandwiching the plurality of wires 1 with the rubber layers 15 as shown in FIG. 9. The wire 1 is normally formed by twisting a plurality of filaments 1a. The respective filaments 1a are spaced from one another in every cross-section of the wire 1, thereby providing clearances 1e between the filaments 1a. Accordingly, there are some cases where the clearance 1e is left as it is without being filled by the rubber when the wire 1 is coated with the rubber layers 15. Further, clearance 1f between the respective wires 1 may be left unfilled with the rubber. A steel wire breaker rubberized according to the calender topping method experiences a problem similar to the above. Such a state allows the respective filaments 1a to move freely relative to one another, thereby disordering an array of the wires 1 and that of the filaments 1a. Particularly, this renders an array of the cords and adhesion thereof to the rubber unstable when the rubberized wire material is to be elongated in the cutting operation and the tire formation.

2. In the foregoing conventional topping calender method, topping accuracy can mainly be controlled based only on the amount of bank rubber. Accordingly, it is not easy to prevent disarray of wires before the topping and uneven thickness in the fabricated rubberized wire sheets.

3. In the foregoing conventional topping calender method, the rubber is required to have sufficient fluidity. Accordingly, it is difficult to rubberize the wire at a low temperature and a high speed.

SUMMARY OF THE INVENTION

It is an object of the present invention to provide a method and an apparatus for fabricating a rubberized wire sheet which assure a satisfactory topping accuracy and an improved adhesion, and are made executable at a low temperature and a high speed.

Accordingly, a method of the invention comprises steps of passing a plurality of wires through an extruder so as to coat surfaces of the respective wires with rubber, and passing the resultant plurality of rubberized wires through a calender roller system so as to produce a rubberized wire sheet having a desired width.

It may be appropriate that the plurality of rubberized wires be further coated with rubber when being passed through the calender roller system so as to produce a rubberized wire sheet of a desired width. Further, it is preferable that the rubber coated on the rubberized wire surface in the calender operation has a higher viscosity than the rubber coated on the wire surfaces in the extruder.

Moreover, it may be appropriate that the plurality of rubberized wires be squeezed by the calender roller system so as to make the surface thereof thinner and flatter in the calender operation.

Further, an apparatus of the invention comprises an extruder capable of permitting a plurality of wires to pass therethrough for coating surfaces of respective passing wires with rubber, and a calender roller system capable of permitting the plurality of rubberized wires to pass therethrough for further coating surfaces of the rubberized wires so as to form a rubberized wire sheet having a desired width.

The calender roller system may merely squeeze the rubberized wires on which a predetermined amount of rubber is coated in the extruder so as to make them into a flatsurfaced rubberized wire sheet.

With the above method and construction, the plurality of wires are coated with rubber in the extruder in advance, and are then calendered into a rubberized wire sheet by the calender roller system. Accordingly, the respective filaments are completely buried in the rubber mass without leaving clearances therebetween, resulting in fabrication of a high quality rubberized wire material.

These and other objects, features and advantages of the present invention will become more apparent upon a reading of the following detailed description and accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS OF THE INVENTION

Figure 1A:
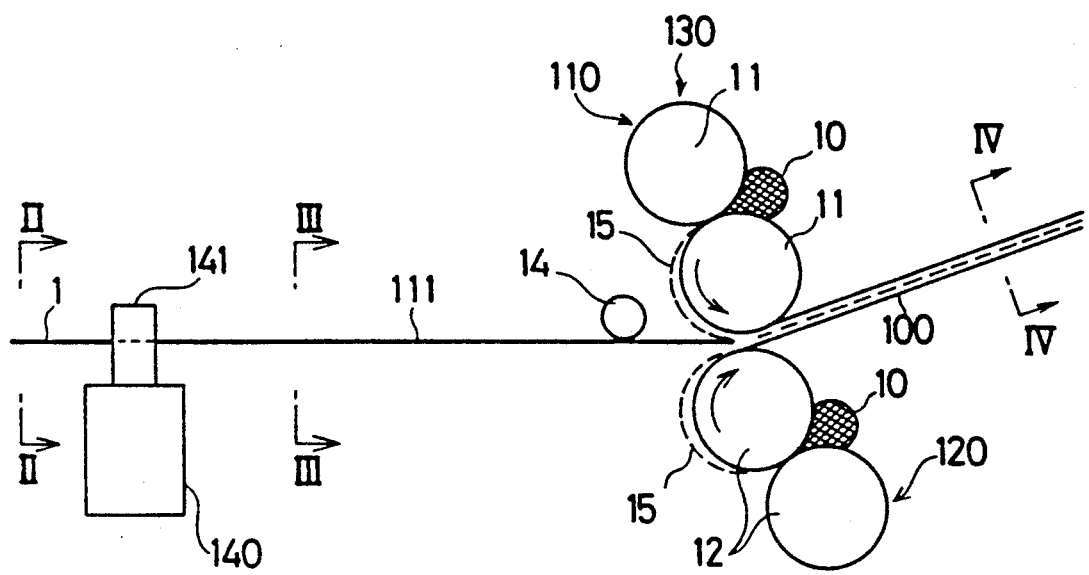
FIG. 1A is a diagram conceptually showing a side elevation of an apparatus embodying the present invention.

In FIG. 1A, indicated at 130 is a topping calender roller system comprising two roller pairs 110 and 120 arranged in a vertical direction. The roller pair 110 consists of two rollers 11. The roller pair 120 consists of two rollers 12. Upstream of the calender roller system 130 is disposed a rubber extruder 140. The rubber extruder 140 has a head 141, to which a predetermined number of wires 1 are fed. The extruder head 141 is adapted for coating rubber on surfaces of the respective wires 1 fed thereto. It should be noted that the extruder used in this embodiment is of the cold feed type, that is, one to which the rubber is directly fed without being warmed up.

Figure 1B:
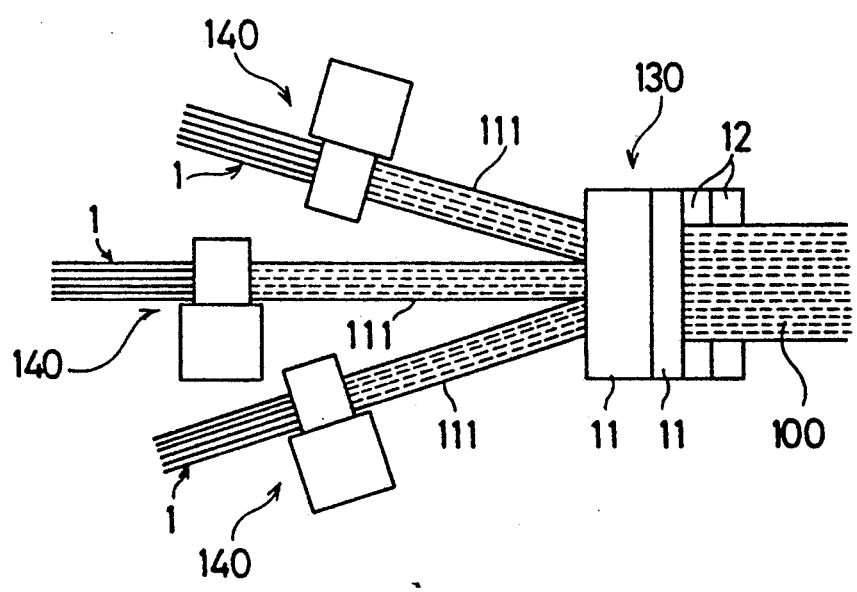
FIG. 1B is a diagram conceptually showing a plan view of the apparatus including three extruders.
Figure 2:
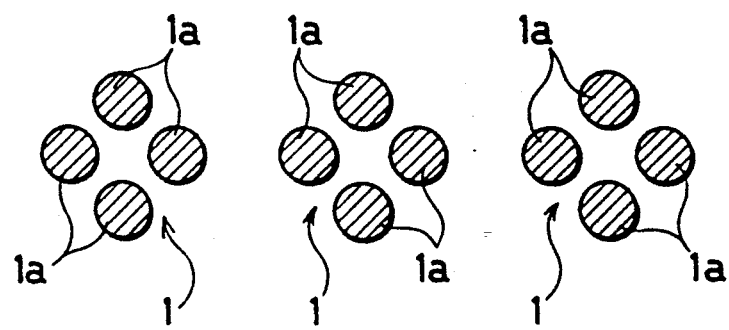
FIG. 2 is a diagram showing a cross section of wires taken along the line II—II in FIG. 1A.

A plurality of extruders may be arranged in a direction perpendicular to the face of FIG. 1A. For example, in order to produce a rubberized wire sheet having a width of 1 m, it may be appropriate to arrange two or more extruders, each capable of rubberizing several hundreds of wires at one time, as shown in FIG. 1B. The respective extruders make the wires 1 fed thereto into rubberized wires 111 and feed the same to the calender roller system 130 in synchronization with one another. The rubberized wires are further coated with rubber in the calender roller system 130, and consequently the rubberized wire sheet is fabricated. Alternatively, it may be appropriate to use a single extruder capable of rubberizing about 1000 wires at one time. Further, the wire 1 is formed by twisting a plurality of filaments 1a (in this embodiment, 4) as shown in FIG. 2. A plurality of wires 1 are arranged in parallel with one another at a predetermined spacing. There is no particular restriction on the number of the filaments constituting the wire 1. Accordingly, the wire 1 may consist of only one filament.

Figure 3:
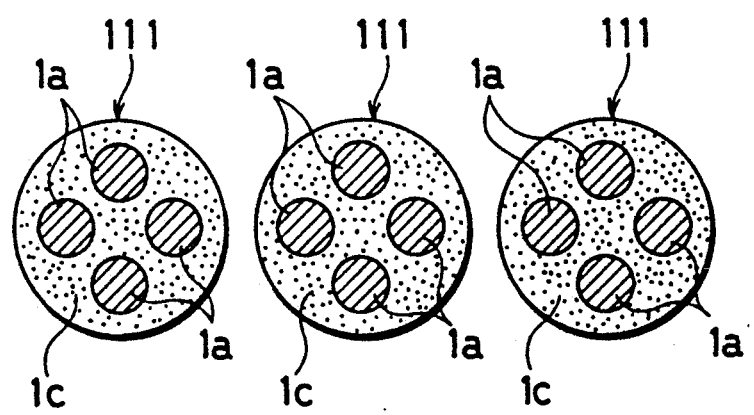
FIG. 3 is a diagram showing a cross section of rubberized wires taken along the line III—III in FIG. 1A.

The extruder head 141 is internally provided with a baffle 142 and a die plate 143. The baffle 142 and the die plate 143 are arranged in alignment with each other in a feed direction of the wire. The wire 1 entering the head 141 of the extruder 140 is guidely positioned by the baffle 142. A predetermined amount of rubber is extruded to be applied to the outer surface of the wire 1 between the baffle 142 and the die plate 143. The die plate 143 regulates the thickness of the rubber applied to the surface of the wire 1 so that a uniform amount of rubber is coated thereon. Thereby, the rubberized wire 111 is formed with the rubber mass 1c adhesively coating the periphery of the filaments 1a as shown in FIG. 3. It should be noted that the die plate and the baffle may be integrally provided in the extruder head.

Figure 7:
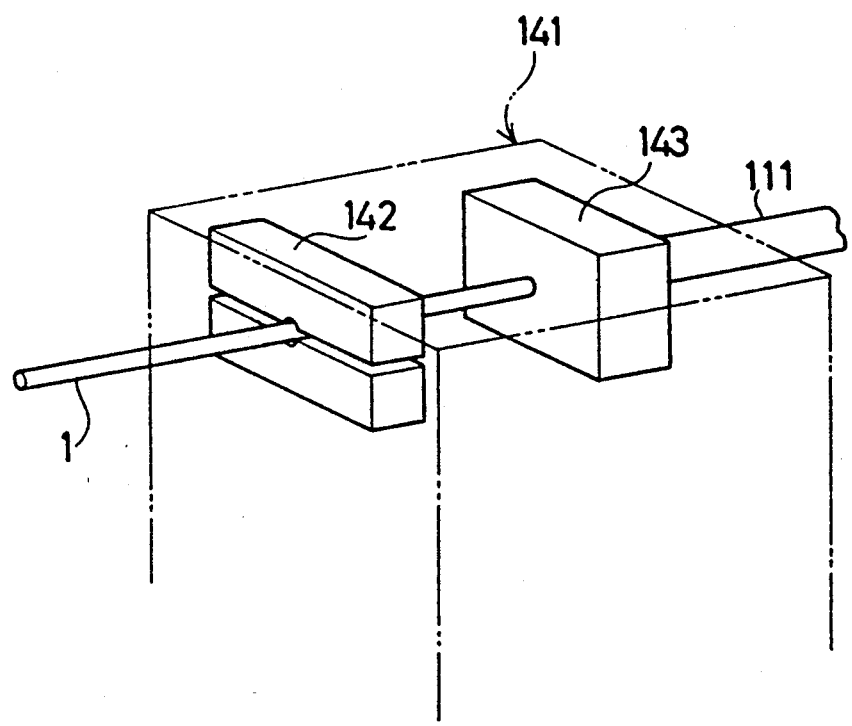
FIG. 7 is a perspective diagram showing a head of the extruder.
Figure 8:
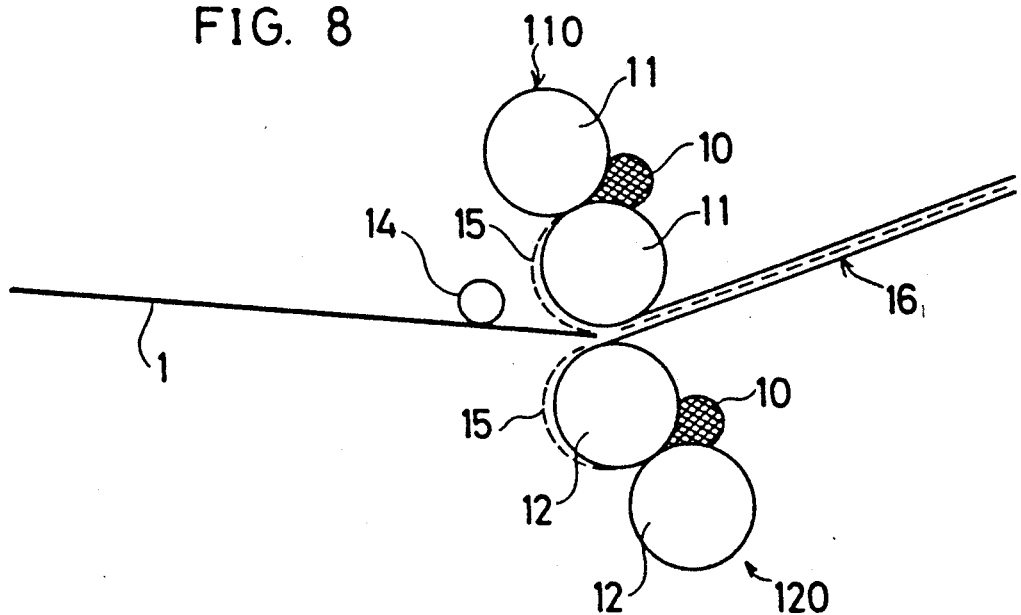
FIG. 8 is a diagram equivalent to FIG. 1A conceptually showing a side elevation of an apparatus of prior art.
Figure 9:
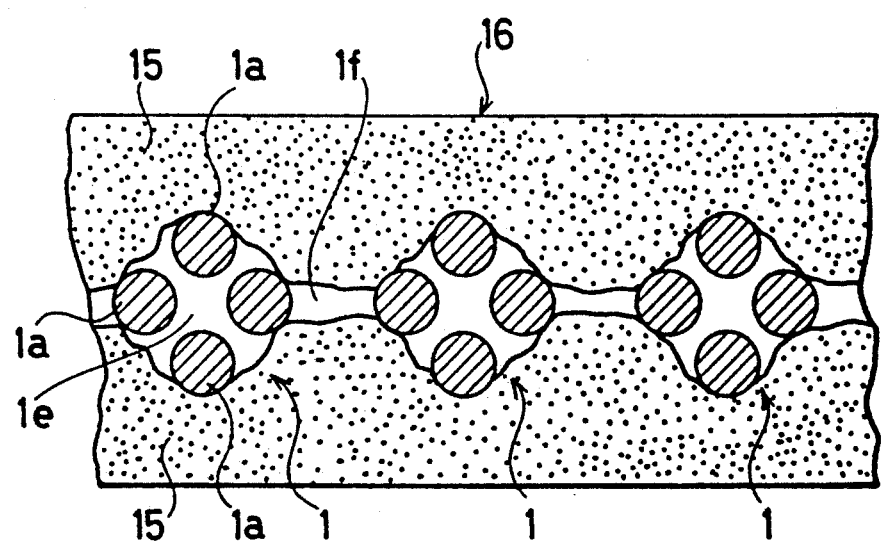
FIG. 9 is a diagram showing a cross section of a rubberized wire sheet fabricated by the prior art.

FIG. 7 illustrates a case where a single wire 1 is passed through a single extruder head 141. However, a plurality of such extruder heads 141 may be arranged in a direction perpendicular to the face of FIG. 1A and actuated in synchronization with one another. Alternatively, a plurality of wires 1, e.g., from several wires to a hundred of wires, may be passed through the baffles 142 and the die plates 143 of the single extruder head 141 respectively, whereby to form the rubberized wires in the shape of a sheet, a belt, or a tape having a desired width, e.g., from 1 m to 150 m.

Figure 4:
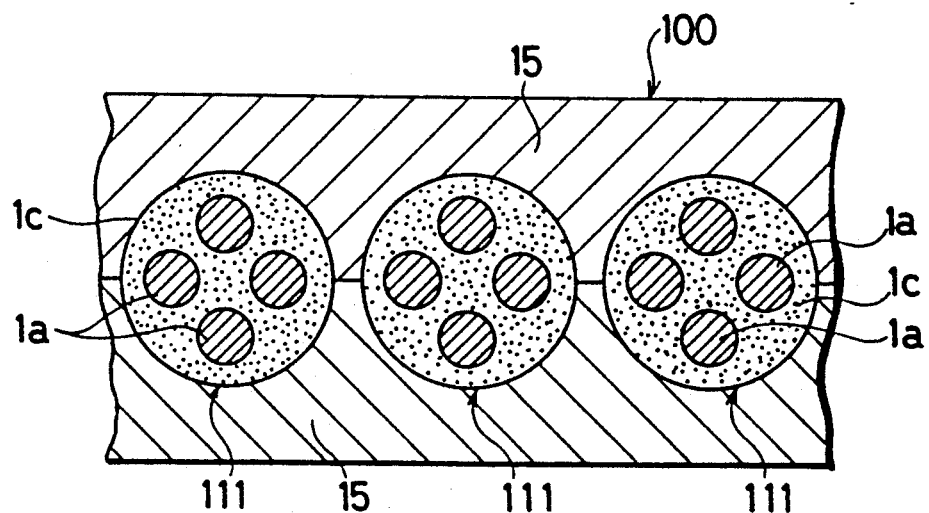
FIG. 4 is a diagram showing a cross section of a rubberized wire sheet taken along the line IV—IV in FIG. 1A.

Thereafter, the plurality of individual rubberized wires 111 are arrayed respectively by an array roller 14 so as to have a predetermined spacing therebetween, and then fed between the rollers 11 and 12 of the calender roller system 130. In the calender roller system 130, two masses 10 of preheated rubber are supplied to the two roller pairs 110 and 120 respectively, and made into layers of rubber by passing respectively between the rollers 11 and between the rollers 12. The rubberized wires 111 are sandwiched with the rubber layers when calendered between the roller pairs 110 and 120, thereby forming a rubberized wire sheet having a cross section as shown in FIG. 4.

Figure 5:
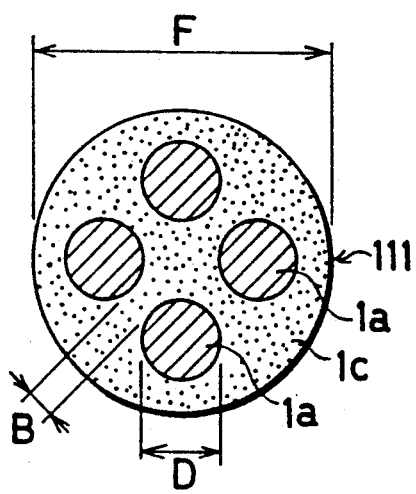
FIG. 5 is a diagram showing a cross section of the rubberized wire, and also showing spatial relationship between filaments and rubber mass.

FIG. 5 shows an exemplary dimension of the rubberized wire 111: The diameter D of the filament 1a is 0.22 mm; the spacing B between the filaments 1a is 0.15 mm; and the diameter F of the rubberized wire 111 is 0.74 mm. The spacings between the filaments 1a can be sufficiently filled with the rubber mass 1c by coating the wire 1 with rubber through the extruder head 141. The respective filaments 1a are completely buried in the rubber mass 1c without leaving clearances between the filaments 1a as shown in FIG. 3.

Since the wires are fed to the calender roller system 130 having already been rubberized, the wires are less likely to disarray before being sandwiched with the rubber layers in the calender roller system 130, while being likely to have constant tensions. Accordingly, as shown in FIG. 4, the rubber layers 15 are completely adhered to the outer surfaces of the rubberized wires 111, leaving no clearances between the rubberized wires 111.

The filaments 1a are completely buried in the rubber mass 1c in the rubberized wire 111, which is in turn completely and adhesively coated with the rubber layers 15. Therefore, the rubberized wire sheet thus fabricated is stable and has high quality.

In the case where bare wires 1 are fed to the calender roller system 130 as in the conventional method, the bare wires 1 are subject to vibration developed when the wires are pressingly coated with the rubber layers 15 by the rollers 11 and 12. This causes the filaments 1a to become disarrayed. However, in the case where the rubberized wires 111 are fed to the calender roller system as described above, the respective filaments are fixedly held in the rubber mass 1c. Further, the rubber mass 1c serves to cushion the aforementioned vibration, obviating the likelihood that the filaments 1a become disarrayed. Accordingly, the rubberized wire sheet 100 can be fabricated with an accurate dimension and a high quality. Further, such a problem can be eliminated as the filaments 1a move relative to one another, causing the dimension of the rubberized wire sheet 100 to change when the rubberized wire sheet 100 is cut, or bent in formation of a tire.

Figure 6:
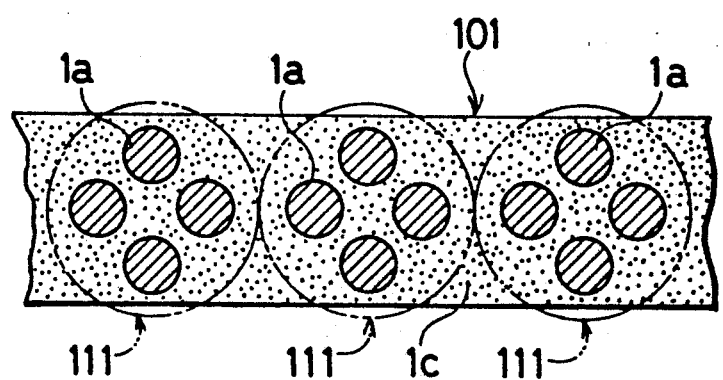
FIG. 6 is a diagram equivalent to FIG. 4 showing a cross section of a rubberized sheet of another embodiment.

Further, it may be appropriate that the wires 1 be coated with an increased amount of rubber in the extruder 140, and the rubberized wires 111 be merely vertically squeezed by the rollers 11 and 12 without being further coated with rubber in the calendar roller system 130. As a consequence, there is fabricated a rubberized wire sheet 101 as shown in FIG. 6. The fabricated rubberized wire sheet 101 has flat surfaces and satisfactory adhesion. Having a smaller thickness, the rubberized wire sheet 101 facilitates the cutting operation.

According to the method of the invention, the wire 1 is firstly coated with the mass of rubber having relatively low viscosity and satisfactory fluidity with the clearances between the filaments 1a completely and uniformly filled in the extruder 140. Subsequently, the rubberized wires 111 are coated with the mass of rubber having relatively high viscosity, thereby producing a rubberized wire sheet in the calender roller system 130. More specifically, the rubberized wire sheet is fabricated by using two different types of rubber. This results in an improvement in strength (green strength) of the rubberized wire sheet, which in turn reduces the expansion and the contraction of the rubberized wire sheet during the processing. Accordingly, the rubberized wire sheet demonstrates an improved uniformity in quality, adhesive property, heat build-up, and operability in each process, such as cutting process and formation process of tire. In addition, the rubberized wire sheet can be fabricated at a reduced cost.

Further, the aforementioned method requires smaller rubber fluidity. Accordingly, the mass of rubber can be fed at a low temperature of, e.g., 90° C. in the calender roller system 130, and a reduced amount of rubber will be coated on the surface of the rubberized wires 111. Therefore, it is possible to calender the rubberized wires at a higher speed, e.g., 2 to 2.5 times the speed of the calendering speed of the conventional method.

Furthermore, according to the method of the invention, a production process of the rubberized wire sheet comprise two stages, namely extruding stage and calender stage. In such a production process, the extruding stage enables a feedback control while the calender stage enabling a feed-forward control. Provision of these two stages can facilitate an automatic control and prevention of the disarray of the wires, and also serves to assuredly fabricate the rubberized wire sheet having a uniform thickness. Specifically, the rubberizing of the wire is first performed with the use of the extruder, and the thickness of the rubber coated on the surface of the wire or the like is measured. The thickness of the rubber coating on the surface of the rubberized wires in the calender roller system may be controlled based on the measured thickness. Further, the amount of rubber extruded in the extruder is changeable independently of the feed rate of the wires. Moreover, the calender roller system can control a gap between the two roller pairs thereof in response to data representative of the amount of rubber coated on the wire in the extruder.

Furthermore, it is possible to use an extruder of the cold feed type according to the present method, thereby obviating the need for a roller for warming up the rubber supplied to the extruder. Consequently, a temperature control of rubber can be more precisely performed.

As described above, according to the present invention, a plurality of wires have surfaces thereof coated with rubber by passing through an extruder so as to form the plurality of rubberized wires. The plurality of rubberized wires are, arranged in parallel to one another, calendered between calender rollers so as to fabricate rubberized wire sheet.

The above invention makes it possible (1) to completely rubberize filaments of wires without any clearance between filaments and to produce a high quality rubberized wire sheet. (Rubber impregnability is improved.)

(2) to obtain easier topping control which assuredly prevents disarray of wires before topping and nonuniformity of topping thickness. (Topping accuracy is improved.)

(3) to necessitate only a smaller rubber fluidity which makes it possible to fabricate a rubberized wire sheet at a lower temperature and a higher speed in comparison with conventional topping calender methods. (Processability is improved.)

(4) to use different types of rubber respectively in the extruding stage and the calender stage. (Two-layer rubberizing insures an improved quality of the rubberized wire sheet.)

(5) to complete rubberizing in the extruding stage and perform only adhesion in the calender stage. (A process is simplified.)

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for fabricating a rubberized wire sheet comprising the steps of:
   passing a plurality of wires through an extruder to coat each of the plurality of wires with rubber to form a plurality of rubberized wires; and then
   passing said plurality of rubberized wires through a calender roller system to form a rubberized wire sheet having a desired width.

2. The method as defined in claim 1, further comprising the step of coating the plurality of rubberized wires with rubber while being passed through the calender roller system.

3. The method as defined in claim 2, wherein the viscosity of rubber used in the calender roller system is higher than that of rubber used in the extruder.

4. The method as defined in any of claims 1, 2 and 3, further comprising the step of squeezing the plurality of rubberized wires by rollers of the calender roller system so that the rubberized wire sheet has a flat surface.

5. An apparatus for fabricating a rubberized wire sheet comprising:
   an extruder for coating a plurality of wires passing therethrough with rubber to form a plurality of rubberized wires; and
   a calender roller system for further coating the plurality of rubberized wires passing therethrough to form the rubberized wire sheet having a desired width, the rubberized wires being fed from the extruder to the calender roller system.

6. An apparatus for fabricating a rubberized wire sheet comprising:
   an extruder for coating a plurality of wires passing therethrough with rubber to form a plurality of rubberized wires; and
   a calender roller system for squeezing the plurality of rubberized wires passing therethrough to form a rubberized wire sheet having a flat surface, the rubberized wires being fed from the extruder to the calender roller system.

* * * * *